Patented June 8, 1937

2,083,132

UNITED STATES PATENT OFFICE 2,083,132

METHOD AND PRODUCT FOR TREATING GLASS WOOL

Robert C. Williams and Hugh M. Bone, Columbus, Ohio, assignors, by mesne assignments, to Owens-Illinois Glass Company, Toledo, Ohio, a corporation of Ohio No Drawing. Application July 30, 1934, Serial No. 737,637. Renewed October 16, 1936

5 Claims. (Cl. 91—68)

This invention relates to an improved method and product for treating glass wool, the object of the invention being to provide a novel surfacing material which when applied to glass wool increases the life and effectiveness of the latter and renders it more suitable and durable in its customary fields of service.

Glass wool is a material composed of fine strands of small diameter filaments of glass. This material is well known in the industry and at present is quite generally used as filter media in air conditioning apparatus and, when in a matted or loosely packed form, is quite extensively used for thermal insulation purposes. To prevent undue breakage of the glass fibers or strands and to increase the effectiveness of glass wool as filter media, it has been an accepted practice to coat the strand surfaces with selected hydrocarbons. Such a coating acts apparently as a lubricant facilitating relative movement between adjoining and contacting fibers, so that there is an absence of seizure or other gripping or inter-locking action between adjacent fibers which is considered to cause the breakage of the individual strands or fibers and diminution in their length. Such breakage often reduces the fibers to such short lengths that there takes place what may be termed a "sifting out" of the smaller reduced fibers from a given body of glass wool. The application of a hydrocarbon lubricant, however, greatly reduces this tendency and preserves the full length and desired state of the individual strands or fibers forming a body of such glass wool.

In treating large quantities of glass wool with hydrocarbon lubricating oils, relatively high treating costs are frequently involved. In addition, such an oleaginous coating is quite inflammable, and this is distinctly objectionable in uses where the element of fire risk must be given consideration. Therefore, it is a primary aim of the present invention to treat glass wool with a novel preparation which, while retaining the lubrication and filtration properties of ordinary hydrocarbon oil, may be employed at much lower cost, and, moreover, will be substantially incombustible at the time of application.

To this end, we have produced a coating agent for glass wool comprising a stable oil-in-water emulsion of which the following formula is a representative example:

| | Percent |
|---|---|
| Hydrocarbon oil (bright stock) 160 viscosity, 210° F. | 10 |
| Water | 81.5 |
| Bentonite | 3.0 |
| Stearic acid | 4.0 |
| Triethanolamine | 1.5 |

While the above proportions are not critical and are subject to considerable variation, yet we have found the same to be quite satisfactory in securing the purposes desired. The emulsion may be applied directly to the glass, in accordance with the above formula, or it may be further diluted with 1 to 3 parts or more of water in which it is readily fluent and miscible. No special apparatus need be employed in compounding the emulsion and we have used the following procedure quite successfully:

Water to the extent of approximately 15% of the total water content of the emulsion may be placed in a heated vessel and to which is added the stearic acid, triethanolamine and bentonite. This mixture is then heated to a temperature of the order of about 200° F. for a period of one to two hours, accompanied with suitable stirring or agitation until it reaches the state of a smooth paste. At this stage, the oil is slowly added while continuing stirring or agitation, followed by the balance of the water content. This operation produces an oil-in-water emulsion, with water in the continuous phase, the said emulsion being capable of being stored or shipped in suitable containers and will remain stable over a period of weeks.

As stated, at the time of use, the emulsion may be further diluted with 1 to 3 parts of water without special equipment. The finally diluted emulsion may then be sprayed or otherwise applied to the fibers of the glass wool to be treated. In practice, this is usually done while the glass wool is traveling on a belt, or other form of conveyor, from the furnace at which it is formed to a tempering lehr or annealing oven and the quantity thereof applied to the glass wool may be varied in accordance with practical demands. Usually the wool is completely saturated with the emulsion. The emulsion has the advantage that when so applied to the wool, it does not adhere to the walls of the spraying booth but the excess material readily flows to a point of draining and returned to the original receptacle. This feature is quite important in reducing fire risks in the industrial establishment where such glass wool is being made and is a distinct advantage over the ordinary process of applying straight hydrocarbon oils to glass surfaces.

It will be obvious that the above specific formula is subject to variation. For instance, in lieu of a bright stock mineral oil, we may use a steam-refined cylinder oil of similar viscosity since oils of high flash point are generally desirable. Again, we have used crude scale paraffin wax to advantage when treating wool for use as insulation. While triethanolamine readily combines with stearic acid to form a soap, we may of course use other accepted alkalies, such as caustic soda or caustic potash. For stearic acid, many of the fatty acids may be substituted, although we have found that oleic acid does not tend to produce such a highly viscous soap as does stearic acid. Many of the ordinary starches may be substituted for bentonite, or we may employ pectin, agar, gelatin, Karaya gum or the like.

As a second example of our improved emulsion, we may use the following:

| | Percent |
|---|---|
| Stearic acid | 2.25 |
| Triethanolamine | .75 |
| Crude scale paraffin wax | 17.00 |
| Light paraffin oil | 2.00 |
| Bentonite | 3.00 |
| Water | 75.00 |

When the emulsion is employed on glass wool intended for use as a gas or air filtration medium, the primary function of the emulsion is to act as a reservoir of oil which remains on the surfaces of the glass fibers or strands and entraps dust and other relatively small solid particles of matter to retain such foreign particles within the physical limits of the filter. In addition, the emulsion also serves to lubricate the individual glass strands or fibers to permit of relative movement between adjacent or contacting strands or fibers and thus minimize breakage thereof and a reduction to a smaller form where they tend to readily sift out of the prinicpal body of glass wool.

A third specific example of our emulsion may be as follows:

| | Percent |
|---|---|
| Oleic acid | 5.6 |
| Stearic acid | 5.6 |
| Borax | 2.8 |
| Caustic potash | 1.8 |
| Bright stock mineral oil | 47.7 |
| Water | 36.5 |

Another example of our improved emulsion may consist in the following:

| | Percent |
|---|---|
| Stearic acid | 18.5 |
| Light mineral oil | 24.5 |
| Crude scale paraffin wax | 9.8 |
| Commercial concentrated 26° Bé. aqua ammonia | 4.0 |
| Water | 43.2 |

At the time of application, this latter emulsion may be further diluted with approximately nine parts of water.

The emulsified hydrocarbon so applied to the glass wool acts apparently as a tempering agent, since the glass wool possesses a fairly high temperature at the time of application of the agent, thus imparting to the glass fibers an increased tensile strength. While the same emulsion may be used upon glass wool employed for thermal insulation and also for filtration purposes, a much more concentrated form is applied in the case of treating wool primarily for dust catching purposes, i. e, air conditioning equipment. Thus in the case of glass wool adapted for use as insulation, we preferably employ approximately 5% by weight of the finally diluted emulsion on the glass wool to be treated, whereas when the glass wool is employed as a filter media, we preferably use about 30% by weight of the finally diluted emulsion. After applying the emulsion for the purposes specified, the bulk of the water evaporates or is evaporated. The amount of oil on the insulation wool is so small (since a very dilute emulsion is used) that it will not propagate flame when an attempt is made to ignite it. In case of filter wool, the amount of oil in the wool after evaporation of water may be sufficiently great to permit of combustion. However, in both cases, no fire hazard exists during the process of application when an emulsion of the described types is used, whereas fire hazard does exist in both instances during the application of straight oils.

In the form of our invention wherein ammonia is employed, waterproofing qualities are present in the applied coating on the glass fibers after the ammonia has volatilized, which enables the latter to resist water attack, since this is particularly desirable in cases where the glass wool may be exposed to the elements during transportation or at the time of building erection. In lieu of ammonia for obtaining this waterproofing quality, we may employ certain of the simpler amines, such as methyl amine or ethyl amine or, again, other ammonium soaps may be used.

In order to provide a permanent substantially non-inflammable coating for the glass wool when used for filter purposes, we have successfully employed the following composition:

| | Percent |
|---|---|
| Water | 37.5 |
| Bentonite | 1.9 |
| Calcium chloride | 37.5 |
| Light paraffin oil | 22.0 |
| Neutral degras | 1.1 |

In producing the above product, bentonite is first added to the water content followed by the addition of calcium chloride These ingredients are then subjected to vigorous agitation while the oil is being added. We have found that calcium chloride does not affect adversely the bentonite if the calcium chloride is added after the bentonite is thoroughly mixed with the water. In this composition, while a soap is not employed, the bentonite acts as the emulsifying agent. It will be appreciated that other deliquescent salt may be used in addition with or substituted for the calcium chloride.

What is claimed is:

1. As a new article of manufacture, glass wool fibers coated with a film deposited from an emulsion of oil and water, the film so deposited being in an amount which adequately lubricates said fibers but is insufficient to propagate flame at the normal ignition temperature of the oil.

2. As a new article of manufacture, glass wool strands coated with a permanent substantially non-inflammable coating remaining after treating the strands with a hydrocarbon-water emulsion containing a deliquescent salt having the characteristics of calcium chloride.

3. The process of treating glass wool strands which comprises the steps of applying to the strands, while the same are heated at a temperature constituting a fire hazard with hydrocarbon oil, a dilute hydrocarbon lubricant emulsion in water which will not support combustion at the temperature of treatment and then removing the water to produce a residual film upon said strands.

4. The process of treating glass wool strands which comprises the steps of applying to the strands, while the same are heated at a temperature constituting a fire hazard with hydrocarbon oil, a dilute hydrocarbon lubricant emulsion in water which contains an emulsifying agent and which water emulsion will not support combustion at the temperature of treatment, and evaporating the water to produce a residual film upon said strands.

5. As a new article of manufacture, glass wool fibers coated with a film deposited from an emulsion of oil-in-water containing a fatty acid soap, the film so deposited being in an amount which adequately lubricates said fibers but is insufficient to propagate flame at the normal ignition temperature of the oil.

ROBERT C. WILLIAMS.
HUGH M. BONE.